(12) United States Patent
Sonntag

(10) Patent No.: US 10,750,365 B2
(45) Date of Patent: Aug. 18, 2020

(54) SUBSCRIBER IDENTITY ELEMENT FOR AUTHENTICATING A COMMUNICATION DEVICE TO A COMMUNICATION NETWORK

(71) Applicant: Deutsche Telekom AG, Bonn (DE)

(72) Inventor: Thomas Sonntag, Wachtberg (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 16/097,628

(22) PCT Filed: Jul. 28, 2017

(86) PCT No.: PCT/EP2017/069157
§ 371 (c)(1),
(2) Date: Oct. 30, 2018

(87) PCT Pub. No.: WO2018/019992
PCT Pub. Date: Feb. 1, 2018

(65) Prior Publication Data
US 2019/0141529 A1 May 9, 2019

(30) Foreign Application Priority Data
Jul. 29, 2016 (EP) ..................................... 16182098

(51) Int. Cl.
*H04W 12/06* (2009.01)
*H04W 12/04* (2009.01)
(Continued)

(52) U.S. Cl.
CPC ............. *H04W 12/06* (2013.01); *H04L 47/78* (2013.01); *H04L 63/0853* (2013.01);
(Continued)

(58) Field of Classification Search
CPC ... H04L 63/0853; H04L 63/102; H04L 47/78; H04L 63/0876; H04W 12/0023;
(Continued)

(56) References Cited

U.S. PATENT DOCUMENTS

2014/0004827 A1   1/2014  O'Leary
2016/0021529 A1*  1/2016  Park ....................... H04W 8/205
                                                        455/410
(Continued)

FOREIGN PATENT DOCUMENTS

WO    WO 2016185129 A1    11/2016

OTHER PUBLICATIONS

V1 Gsm Assication: "RSP Technical Specification Version 1.1", Jun. 9, 2016 (Jun. 9, 2016), pp. 1-125, XP055320845.
(Continued)

*Primary Examiner* — Robert C Scheibel
(74) *Attorney, Agent, or Firm* — Leydig, Voit & Mayer, Ltd.

(57) ABSTRACT

A subscriber identity element authenticates a communication device to a communication network. The subscriber identity element is assigned a subscriber identity identifier. The communication network comprises a subnetwork having a discovery server. The subscriber identity element comprises: a memory in which an initialization profile of the subscriber identity element is stored, wherein the initialization profile indicates a subnetwork identifier the subnetwork; and a communication interface, configured to establish a communication link to the discovery server using the subnetwork identifier and to transmit the subscriber identity identifier to the discovery server via the communication link.

9 Claims, 6 Drawing Sheets

(51) Int. Cl.

| | | |
|---|---|---|
| *H04W 8/24* | (2009.01) | |
| *H04W 12/00* | (2009.01) | |
| *H04W 8/20* | (2009.01) | |
| *H04L 12/911* | (2013.01) | |
| *H04W 28/02* | (2009.01) | |
| *H04W 40/24* | (2009.01) | |
| *H04L 29/06* | (2006.01) | |
| *H04W 8/00* | (2009.01) | |
| *H04W 92/10* | (2009.01) | |

(52) U.S. Cl.
CPC ............. *H04W 8/005* (2013.01); *H04W 8/20* (2013.01); *H04W 8/245* (2013.01); *H04W 12/0023* (2019.01); *H04W 12/04* (2013.01); *H04W 28/0215* (2013.01); *H04W 40/24* (2013.01); *H04W 92/10* (2013.01)

(58) Field of Classification Search
CPC ..... H04W 12/06; H04W 8/245; H04W 8/005; H04W 8/20; H04W 92/10; H04W 280/0215; H04W 40/24; H04W 76/11; H04W 12/04–0609; H04W 8/18; H04W 8/205; H04W 8/22; H04W 8/24
See application file for complete search history.

(56) References Cited

U.S. PATENT DOCUMENTS

| | | | |
|---|---|---|---|
| 2016/0127132 A1 | 5/2016 | Lee et al. | |
| 2017/0164212 A1* | 6/2017 | Opsenica | H04W 12/06 |
| 2017/0338954 A1* | 11/2017 | Yang | H04L 9/0838 |
| 2018/0014178 A1* | 1/2018 | Baek | H04W 8/20 |
| 2018/0146364 A1 | 5/2018 | Coureau et al. | |
| 2019/0053040 A1* | 2/2019 | Long | H04W 8/18 |

OTHER PUBLICATIONS

Anonymous: "3$^{rd}$ Generation Partnership Project; Technical Specification Group Services and System Aspects; Study on the Security Aspects of the Next Generation System (Release 14)", 3GPP TR 33.399 V0.5.0 (Jan. 1, 2016). XP055479831.

* cited by examiner

SUBSCRIBER IDENTITY ELEMENT FOR AUTHENTICATING A COMMUNICATION DEVICE TO A COMMUNICATION NETWORK

CROSS-REFERENCE TO RELATED APPLICATIONS

This application is a U.S. National Phase application under 35 U.S.C. § 371 of International Application No. PCT/EP2017/069157, filed on Jul. 28, 2017, and claims benefit to European Patent Application No. EP 16182098.0, filed on Jul. 29, 2016. The International Application was published in German on Feb. 1, 2018 as WO 2018/019992 A1 under PCT Article 21(2).

FIELD

The present invention relates to the field of communication technology, in particular the authenticating of a communication device to a communication network.

BACKGROUND

Subscriber identity elements are usually used for authenticating communication devices, for example mobile telephones, to a communication network. The subscriber identity elements are thereby configured to store data uniquely identifying the respective communication device.

With communication devices pursuant to the GSM standard (Global System for Mobile Communications), subscriber identity elements in the form of e.g. smart cards are used, which are also referred to as SIMs (Subscriber Identity Module). This includes for example an IMSI (International Mobile Subscriber Identity) which is assigned to a user of the communication device and is used to authenticate the communication device to the communication network.

Fifth-generation (5G) and further generation communication networks provide for subscriber identity elements to be fixedly integrated in the communication devices and for the respective data for identifying and authenticating to be provided via the communication network in the form of subscriber profiles.

SUMMARY

In an exemplary embodiment, the invention provides a subscriber identity element for authenticating a communication device to a communication network. The subscriber identity element is assigned a subscriber identity identifier. The communication network comprises a subnetwork having a discovery server. The subscriber identity element comprises: a memory in which an initialization profile of the subscriber identity element is stored, wherein the initialization profile indicates a subnetwork identifier of the subnetwork; and a communication interface, configured to establish a communication link to the discovery server using the subnetwork identifier and to transmit the subscriber identity identifier to the discovery server via the communication link.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
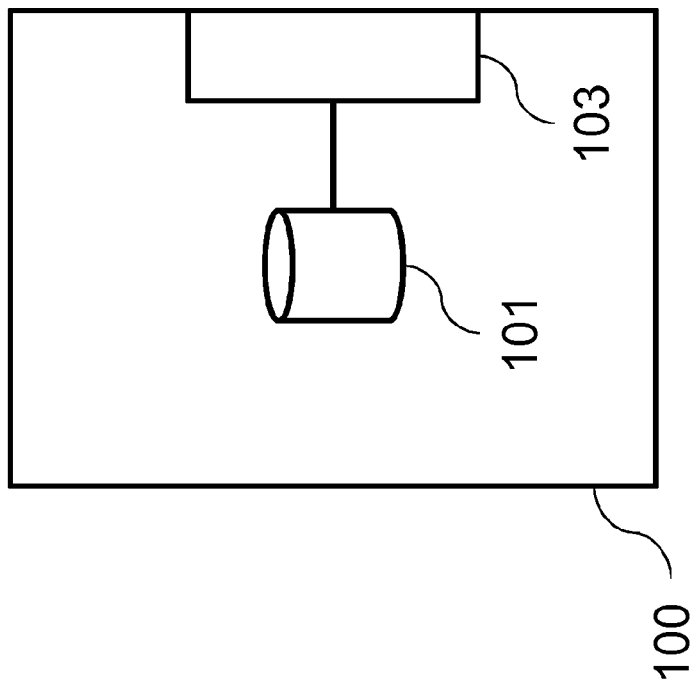
FIG. 1 is a schematic diagram of a subscriber identity element for authenticating a communication device to a communication network.

Exemplary embodiments of the present invention provide for efficiently initializing a subscriber identity element of a communication device.

Exemplary embodiments of the present invention provide a subscriber identity element which is able to communicate with a discovery server of a communication network. The discovery server is thereby assigned to a subnetwork of the communication network, whereby the discovery server can be accessed using a subnetwork identifier of the subnetwork.

The subscriber identity element is configured to receive a profile server identifier of a profile server from the discovery server and retrieve a subscriber profile from the profile server using the profile server identifier. The subscriber profile thereby comprises data which can be used to identify and authenticate the communication device to the communication network.

This thereby achieves a dedicated subnetwork being able to be provided with a discovery server in order to assign a subscriber profile to a subscriber identity element. The subnetwork can, for example, be a slice of the communication network.

According to a first aspect, the invention relates to a subscriber identity element for authenticating a communication device to a communication network, whereby the subscriber identity element is assigned a subscriber identity identifier, and whereby the communication network comprises a subnetwork having a discovery server. The subscriber identity element has a memory in which an initialization profile of the subscriber identity element is stored, whereby the initialization profile indicates a subnetwork identifier of the subnetwork. The subscriber identity element further comprises a communication interface configured to establish a communication link to the discovery server using the subnetwork identifier and to transmit the subscriber identity identifier to the discovery server via the communication link. The subscriber identity element can be an eSIM (embedded SIM), a UICC (Universal Integrated Circuit Card) or an eUICC (embedded Universal Integrated Circuit Card).

According to one embodiment, the subscriber identity identifier is stored in the memory. The subscriber identity identifier can be an eID (eUICC-ID).

According to one embodiment, the discovery server is assigned a discovery server identifier, whereby the initialization profile further indicates the discovery server identifier, and whereby the communication interface is further configured to establish the communication link to the discovery server using the discovery server identifier. The discovery server identifier can be a URI (Uniform Resource Identifier) of the discovery server.

According to one embodiment, the communication network further comprises a profile server, whereby the profile server is assigned a profile server identifier, and whereby the communication interface is further configured to receive the profile server identifier from the discovery server via the communication link. The profile server can be an SMDP (Subscription Manager Data Preparation) server or an SMDP+ (Subscription Manager Data Preparation Plus) server. The profile server identifier can be a URI (Uniform Resource Identifier) of the profile server.

According to one embodiment, the communication interface is further configured to establish a further communication link to the profile server using the profile server identifier and to retrieve a subscriber profile from the profile server via the further communication link. The subscriber profile can comprise an IMSI (International Mobile Subscriber Identity).

According to one embodiment, the communication interface is further configured to establish the communication link to the discovery server upon an initialization, in particular an initial initialization, of the subscriber identity element. The initialization profile can thus be used for the initializing of the subscriber identity element. The initialization profile can be a bootstrap profile.

According to one embodiment, the communication network is a communication network of the fifth generation (5G) or a further generation, whereby the subnetwork is a slice of the communication network, and whereby the subnetwork identifier is a slice identifier.

According to a second aspect, the invention relates to a communication device for communicating over a communication network. The communication device comprises a subscriber identity element according to the first aspect of the invention, whereby the subscriber identity element is configured to authenticate the communication device to the communication network.

According to a third aspect, the invention relates to a discovery server for communicating with a subscriber identity element over a communication network, whereby the discovery server is assigned to a subnetwork of the communication network, and whereby the subscriber identity element is configured to establish a communication link to the discovery server using a subnetwork identifier of the subnetwork. The discovery server comprises a communication interface which is configured to receive a subscriber identity identifier from the subscriber identity element via the communication link, whereby the subscriber identity element is associated with the subscriber identity identifier. The discovery server further comprises a processor which is configured to determine a profile server identifier of a profile server on the basis of the subscriber identity identifier, whereby the profile server is associated with the subscriber identity element. The communication interface is further configured to transmit the profile server identifier to the subscriber identity element via the communication link.

According to one embodiment, the communication interface is further configured to communicate with a database, whereby the database is assigned to the subnetwork, whereby the database indicates an assignment of a plurality of subscriber identity identifiers to a plurality of profile server identifiers, and whereby each subscriber identity identifier is associated with a profile server identifier.

According to one embodiment, the processor is further configured to compare the received subscriber identity identifier to the plurality of subscriber identity identifiers, whereby the communication interface is configured to retrieve a profile server identifier associated with the received subscriber identity identifier from the database.

According to a fourth aspect, the invention relates to a communication system for communicating over a communication network. The communication system comprises a communication device, whereby the communication device comprises a subscriber identity element in accordance with the first aspect of the invention. The communication system further comprises a discovery server according to the third aspect of the invention, whereby the discovery server is assigned to a subnetwork of the communication network.

According to one embodiment, the communication system comprises a database, whereby the database is assigned to the subnetwork, whereby the database indicates an assignment of a plurality of subscriber identity identifiers to a plurality of profile server identifiers, and whereby each subscriber identity identifier is associated with a profile server identifier. The discovery server can communicate with the database.

According to a fifth aspect, the invention relates to a subnetwork of a communication network having a plurality of subnetworks, and a discovery server according to the third aspect of the invention which is arranged in the subnetwork and is addressable via said subnetwork. The subnetwork can be a point-to-point subnetwork.

According to one embodiment, the communication network is a communication network of the fifth generation (5G) or a further generation, whereby the subnetwork is a slice of the communication network, and whereby the discovery server is addressable using a subnetwork identifier of the subnetwork.

According to a sixth aspect, the invention relates to a method for the authenticating of a communication device to a communication network using a subscriber identity element, whereby the subscriber identity element comprises a memory and a communication interface, whereby the subscriber identity element is assigned a subscriber identity identifier, whereby the communication network comprises a subnetwork with a discovery server, whereby an initialization profile of the subscriber identity element is stored in the memory, and whereby the initialization profile indicates a subnetwork identifier of the subnetwork. The method comprises establishing a communication link to the discovery server using the subnetwork identifier by utilizing the communication interface and transmitting the subscriber identity identifier to the discovery server via the communication link by utilizing the communication interface. The method can be executed by the subscriber identity element. Further features of the method result directly from the features and/or functions of the subscriber identity element.

According to a seventh aspect, the invention relates to a method for communicating with a subscriber identity element over a communication network using a discovery server, whereby the discovery server comprises a communication interface and a processor, whereby the discovery server is assigned to a subnetwork of the communication network, and whereby the subscriber identity element is configured to establish a communication link to the discovery server using a subnetwork identifier of the subnetwork. The method comprises receiving a subscriber identity identifier from the subscriber identity element via the communication link by utilizing the communication interface, whereby the subscriber identity element is associated with the subscriber identity identifier, determining a profile server identifier of a profile server on the basis of the subscriber identity identifier by utilizing the processor, whereby the profile server is associated with the subscriber identity element, and transmitting the profile server identifier to the subscriber identity element via the communication link by utilizing the communication interface. The method can be executed by the discovery server. Further features of the method result directly from the features and/or functions of the discovery server.

According to an eighth aspect, the invention relates to a computer program having a program code for executing the method according to the sixth aspect of the invention or the method according to the seventh aspect of the invention when the computer program is run on a computer. The subscriber identity element and/or the discovery server can be technically configured in the programming sense to run the computer program.

Exemplary embodiments of the invention can be implemented in hardware and/or in software.

FIG. 1 shows a schematic diagram of a subscriber identity element 100 for authenticating a communication device to a communication network. The subscriber identity element 100 is assigned a subscriber identity identifier. The communication network comprises a subnetwork having a discovery server.

The subscriber identity element 100 has a memory 101 in which an initialization profile of the subscriber identity element 100 is stored, whereby the initialization profile indicates a subnetwork identifier of the subnetwork. The subscriber identity element 100 further comprises a communication interface 103 which is configured to establish a communication link to the discovery server using the subnetwork identifier and transmit the subscriber identity identifier to the discovery server via the communication link.

Figure 2:
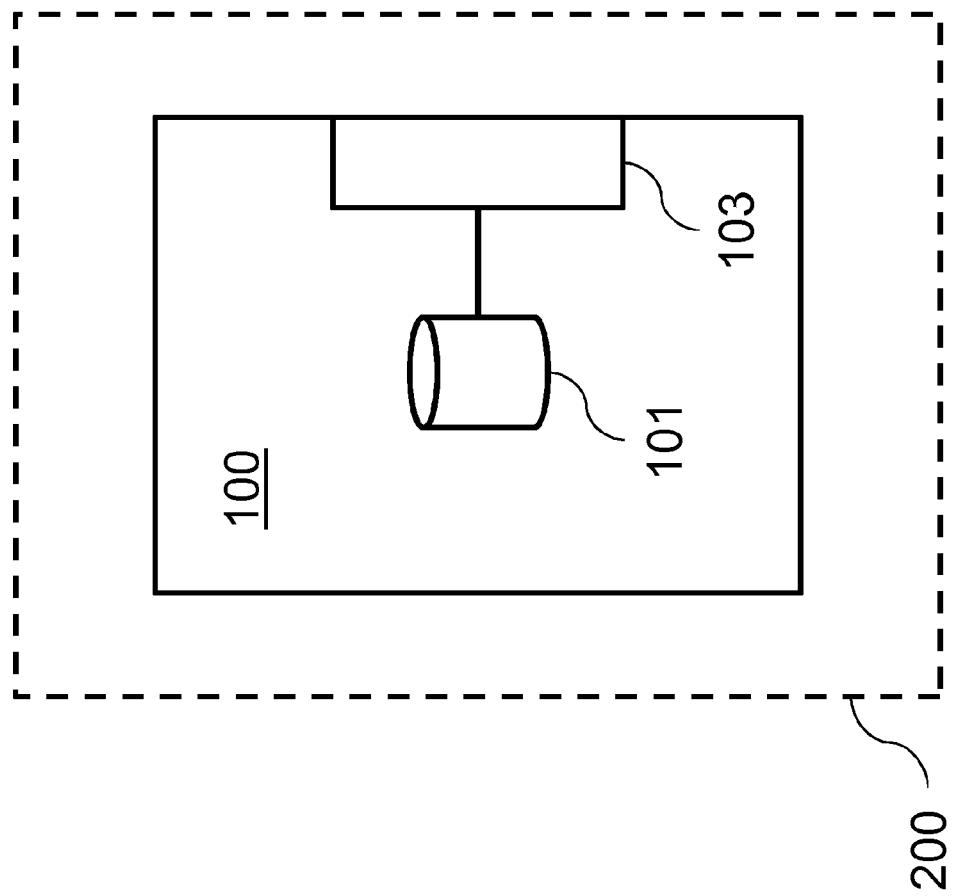
FIG. 2 is a schematic diagram of a communication device for communicating over a communication network.

FIG. 2 shows a schematic diagram of a communication device 200 for communicating over a communication network. The communication device 200 comprises a subscriber identity element 100, whereby the subscriber identity element 100 is configured to authenticate the communication device 200 to the communication network. The subscriber identity element 100 is assigned a subscriber identity identifier. The communication network comprises a subnetwork with a discovery server.

The subscriber identity element 100 has a memory 101 in which an initialization profile of the subscriber identity element 100 is stored, whereby the initialization profile indicates a subnetwork identifier of the subnetwork. The subscriber identity element 100 further comprises a communication interface 103 configured to establish a communication link to the discovery server using the subnetwork identifier and transmit the subscriber identity identifier to the discovery server via the communication link.

Figure 3:
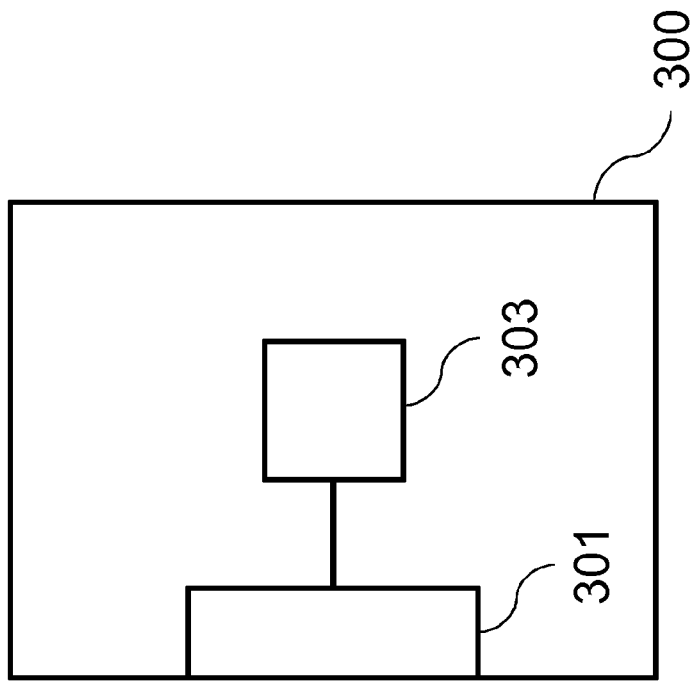
FIG. 3 is a schematic diagram of a discovery server for communicating with a subscriber identity element over a communication network.

FIG. 3 shows a schematic diagram of a discovery server 300 for communicating with a subscriber identity element over a communication network. The discovery server 300 is assigned to a subnetwork of the communication network. The subscriber identity element is configured to establish a communication link to the discovery server 300 using a subnetwork identifier of the subnetwork.

The discovery server 300 comprises a communication interface 301 which is configured to receive a subscriber identity identifier from the subscriber identity element via the communication link, whereby the subscriber identity element is associated with the subscriber identity identifier. The discovery server 300 further comprises a processor 303 which is configured to determine a profile server identifier of a profile server on the basis of the subscriber identity identifier, whereby the profile server is associated with the subscriber identity element. The communication interface 301 is further configured to transmit the profile server identifier to the subscriber identity element via the communication link.

Figure 4:
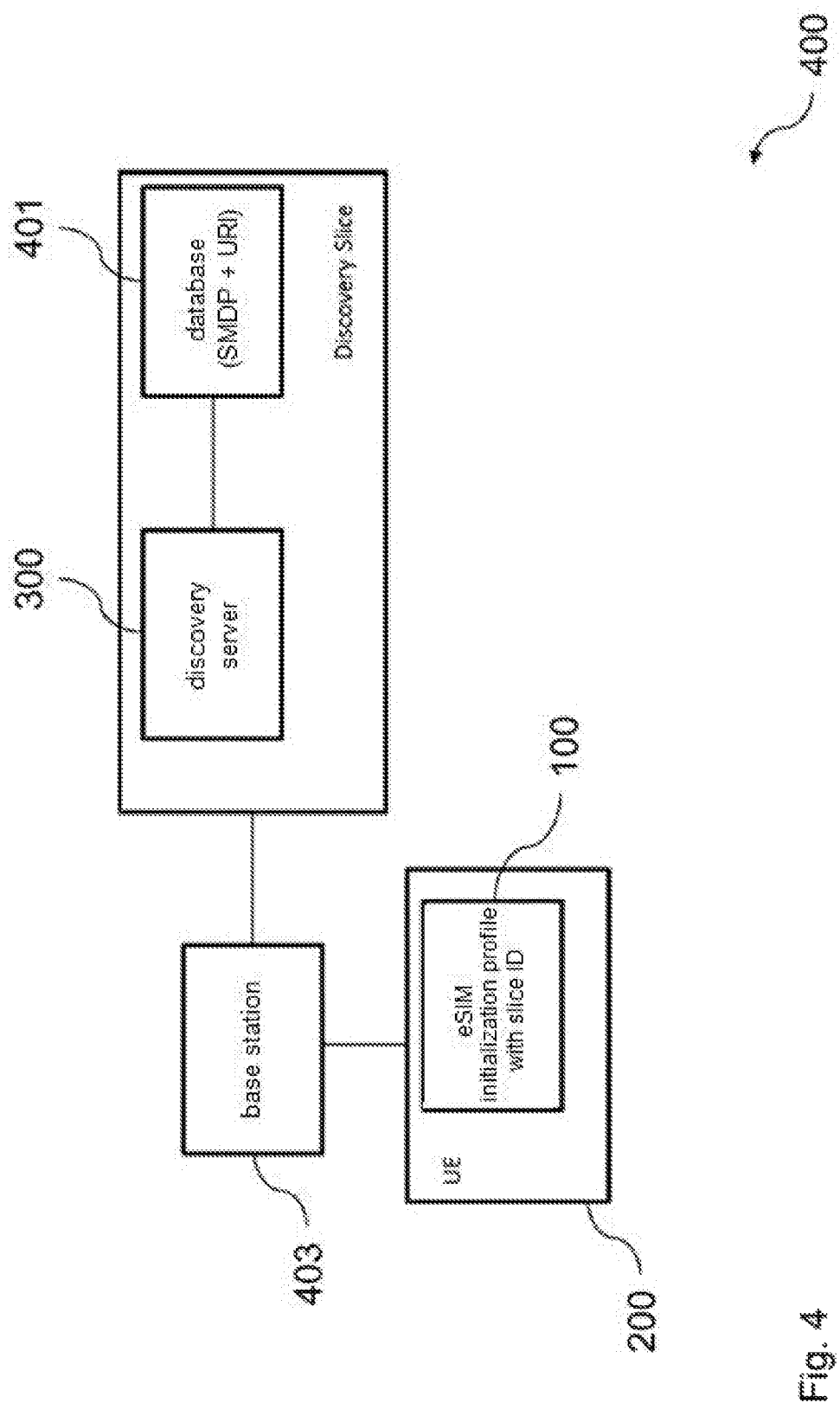
FIG. 4 is a schematic diagram of a communication system for communicating over a communication network.

FIG. 4 shows a schematic diagram of a communication system 400 for communicating over a communication network.

The communication system 400 comprises a communication device 200, whereby the communication device 200 comprises a subscriber identity element 100. The communication system 400 further comprises a discovery server 300, whereby the discovery server 300 is assigned to a subnetwork of the communication network. The communication system 400 further comprises a database 401, whereby the database 401 is assigned to the subnetwork. The database 401 indicates an assignment of a plurality of subscriber identity identifiers to a plurality of profile server identifiers, whereby each subscriber identity identifier is associated with a profile server identifier. The communication between the subscriber identity element 100 and the discovery server 300 ensues via a base station 403 of the communication network.

The subnetwork comprises the discovery server 300 which is arranged in the subnetwork and is addressable via the subnetwork. The subnetwork can be a slice or a discovery slice of the communication network.

The subscriber identity element 100, which for example may be an eSIM, can be provided with an initialization profile, for example a bootstrap profile, which can comprise a discovery server identifier, for example a URI, of the discovery server 300. Moreover, initial connectivity can be provided for example via WLAN (Wireless Local Area Network) or via a cable connection. Upon initially logging into the communication network, the subscriber identity element 100 can communicate the subscriber identity identifier, for example an eID, to the discovery server 300, which can then assign a profile server, for example an SMDP+ server to the subscriber identity element 100 on that basis and transmit a profile server identifier, for example a URI, of the profile server to the subscriber identity element 100. The profile server provides a subscriber profile for the subscriber identity element 100 which can originate from an MNO (Mobile Network Operator). The providing of a discovery service is desirable, particularly for communication networks of the fifth generation (5G) and further generations.

Instead of an isolated discovery server 300, a subnetwork of the communication network can be provided with the discovery server 300. One embodiment makes use of a slice, e.g. a discovery slice, in which the discovery server 300 is disposed. The subnetwork can be operated by an MNO.

In addition to the discovery server identifier, e.g. the URI, of the discovery server 300, the initialization profile can comprise a subnetwork identifier, for example a slice identifier, of the subnetwork. The identifiers can further be provided in the communication device 200, which may be a UE (User Equipment). This is then particularly advantageous when the discovery service (DS) bears more relation to the communication device 200 than to the subscriber profile. For example, a manufacturer of the communication device 200 may provide a proprietary DS.

The routing in the subnetwork, e.g. the slice, can ensue via the subnetwork identifier, e.g. the slice identifier, in the initialization profile. The discovery server 300 as well as the database 401 can be disposed in the subnetwork, whereby the database 401 can indicate the profile server identifiers, for example the URIs, of the profile server, for example the SMDP+ server. The discovery server 300 and/or the database 401 can be in centralized or decentralized arrangement. The decentralized arrangement has the advantage of the database 401 being able to be updated independently of the discovery server 300.

The discovery server 300 can for example run a computer program able to provide the following components:

a communication server, for example an HTTP (Hypertext Transfer Protocol) server, via which different clients can connect. For example, the communication device 200 can be a client when it queries the profile server identifier, e.g. an SMDP+ URI, for a subscriber identity identifier, for example an eID. Furthermore, the profile server, e.g. the SMDP+ server, can be a client when it stores its profile server identifier, e.g. URI, for a subscriber identity identifier, for example an eID.

a persistence layer for communication with the database 401 in which pairs (SMDP+ URI, EID) can for example be temporarily stored.

Different implementations are hereby possible. For example, a route HTTP request can be distributed across multiple HTTP servers which access the database 401.

The discovery server 300 can determine the profile server, e.g. the SMDP+ server, or its profile server identifier on the basis of the subscriber identity identifier, e.g. the eID, and can retrieve the profile server identifier, e.g. the SMDP+ URI, to be communicated to the subscriber identity element 100 from the database 401. In a next step, the subscriber identity element 100 can contact the profile server, e.g. the SMDP+ server, and from there retrieve the subscriber profile.

If the profile server, for example the SMDP+ server, is associated with an MNO, the database 401 can manage the subscriber profiles. In this case, the subnetwork, e.g. the slice, can also communicate the subscriber profile directly to the subscriber identity element 100.

This thereby achieves the advantage of less loading of the overall communication network upon login during initialization of the subscriber identity element 100 and this being able to ensue via the subnetwork, e.g. the slice. The subnetwork, e.g. the slice, can further be managed more easily than a plurality of decentrally arranged servers.

Figure 5:
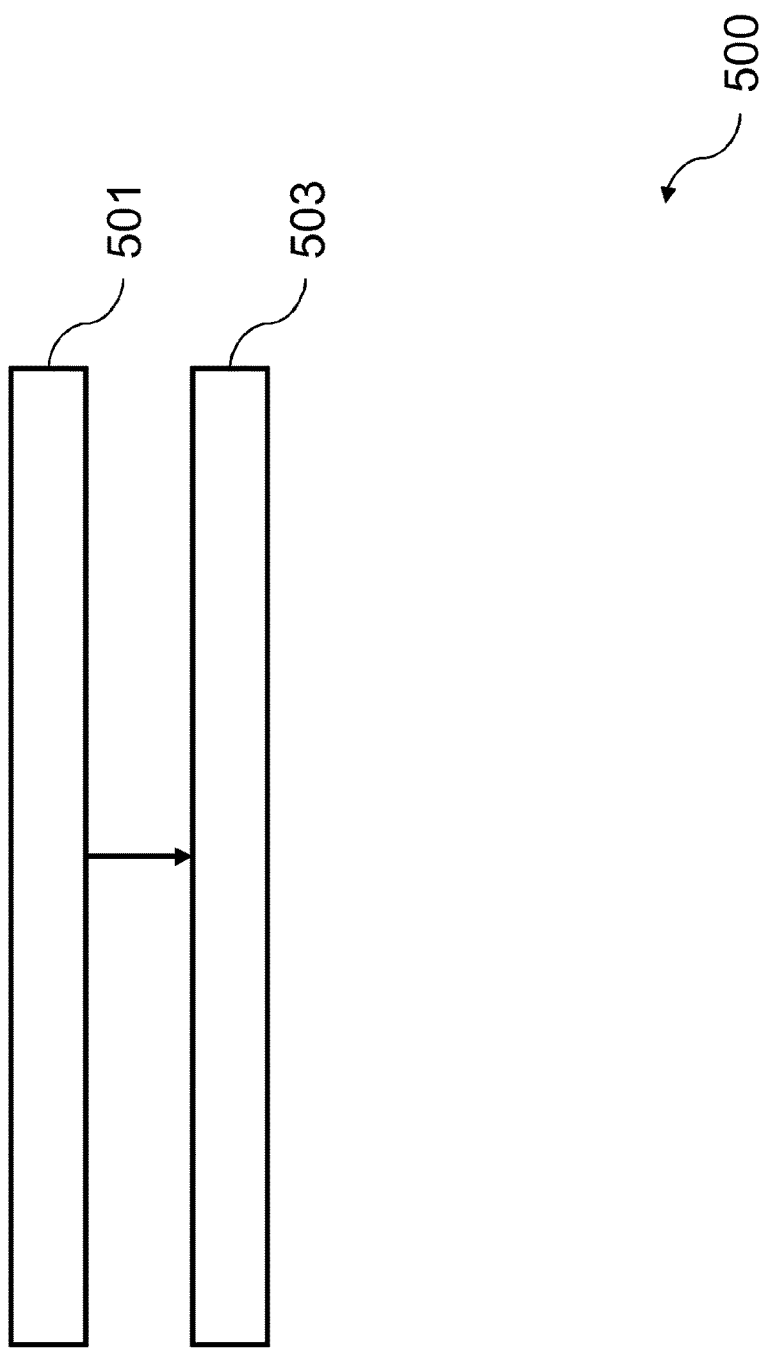
FIG. 5 is a schematic diagram of a method for authenticating a communication device to a communication network using a subscriber identity element.

FIG. 5 shows a schematic diagram of a method 500 for authenticating a communication device to a communication network using a subscriber identity element. The subscriber identity element has a memory and a communication interface. The subscriber identity element is assigned a subscriber identity identifier. The communication network comprises a subnetwork with a discovery server. An initialization profile of the subscriber identity element is stored in the memory, whereby the initialization profile indicates a subnetwork identifier of the subnetwork.

The method 500 comprises establishing 501 a communication link to the discovery server via the communication interface using the subnetwork identifier and transmitting 503 the subscriber identity identifier over the communication link to the discovery server via the communication interface.

Figure 6:
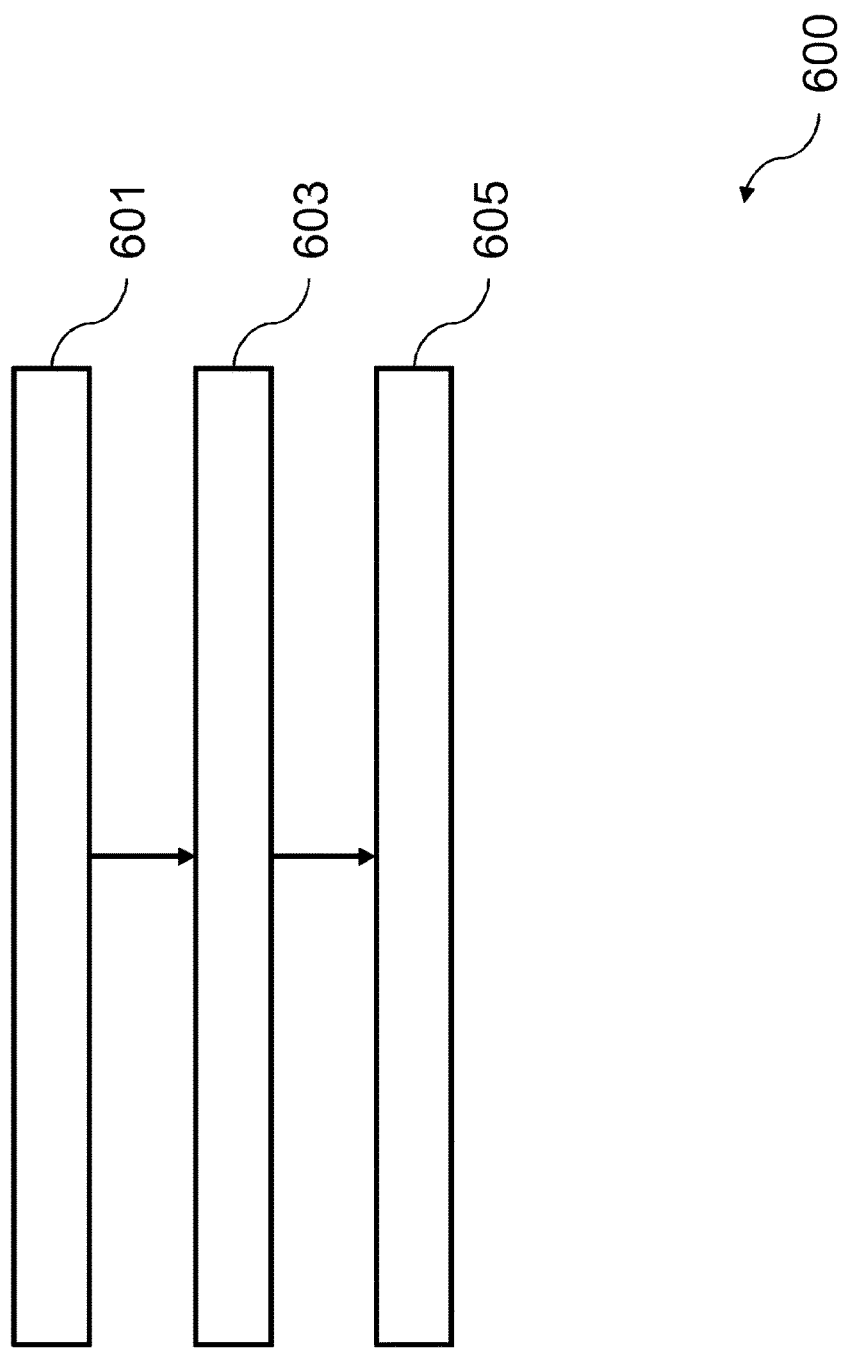
FIG. 6 is a schematic diagram of a method for communicating with a subscriber identity element over a communication network using a discovery server.

FIG. 6 shows a schematic diagram of a method 600 for communicating with a subscriber identity element over a communication network using a discovery server. The discovery server comprises a communication interface and a processor. The discovery server is associated with a subnetwork of the communication network. The subscriber identity element is configured to establish a communication link to the discovery server using a subnetwork identifier of the subnetwork.

The method 600 comprises receiving 601 a subscriber identity identifier from the subscriber identity element via the communication link by utilizing the communication interface, whereby the subscriber identity element is associated with the subscriber identity identifier, determining 603 a profile server identifier of a profile server on the basis of the subscriber identity identifier by utilizing the processor, whereby the profile server is associated with the subscriber identity element, and transmitting 605 the profile server identifier to the subscriber identity element over the communication link via the communication interface.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 100 subscriber identity element
101 memory
103 communication interface
200 communication device
300 discovery server
301 communication interface
303 processor
400 communication system
401 database
403 base station
500 authentication method
501 establishing
503 transmitting
600 communication method
601 receiving
603 determining
605 transmitting

The invention claimed is:

1. A communication system for communicating over a communication network which comprises a subnetwork, the subnetwork being operated by a mobile network operator (MNO), the system comprising:
   a communication device, wherein the communication device comprises a subscriber identity element for authenticating the communication device to the communication network, wherein the subscriber identity element is assigned a subscriber identity identifier, wherein the subscriber identity element comprises:
      a memory in which a bootstrap profile of the subscriber identity element is stored, wherein the bootstrap profile indicates a subnetwork identifier of the subnetwork and a discovery server identifier for a discovery server; and
      a communication interface configured to establish a communication link to the discovery server using the subnetwork identifier and to transmit the subscriber identity identifier to the discovery server via the communication link;
   the discovery server configured to communicate with the subscriber identity element over the communication network, wherein the discovery server is assigned to the subnetwork of the communication network, where the subnetwork corresponds to a discovery slice, wherein the discovery server is located in the subnetwork and addressable via the subnetwork, and wherein the discovery server comprises:
      a processor configured to determine a profile server identifier of a profile server based on the subscriber identity identifier, wherein the profile server is associated with the subscriber identity element; and
      a communication interface configured to receive the subscriber identity identifier from the subscriber identity element via the communication link and to transmit the profile server identifier to the subscriber identity element via the communication link; and
   a database assigned to the subnetwork, wherein the database is configured to:
      indicate an assignment of a plurality of subscriber identity identifiers to a plurality of profile server identifiers, wherein a subscriber identity identifier is associated with a profile server identifier; and
      manage subscriber profiles;
   wherein the subscriber identity element and the discovery server are configured to communicate via a base station of the communication network;
   wherein the discovery server and the database are arranged in a decentralized manner.

2. The communication system according to claim 1, wherein the communication interface of the subscriber identity element is further configured to establish the communication link to the discovery server using the discovery server identifier.

3. The communication system according to claim 1, wherein the communication network further comprises a profile server, wherein the profile server is assigned the profile server identifier, and wherein the communication interface of the subscriber identity element is further configured to receive the profile server identifier from the discovery server via the communication link.

4. The communication system according to claim 3, wherein the communication interface of the subscriber identity element is further configured to establish a further communication link to the profile server using the profile server identifier and to retrieve a subscriber profile from the profile server via the further communication link.

5. The communication system according to claim 1, wherein the communication interface of the subscriber identity element is further configured to establish the communication link to the discovery server upon an initial initialization of the subscriber identity element.

6. The communication system according to claim 1, wherein the subnetwork identifier is a slice identifier.

7. The communication system according to claim 1, wherein the communication interface of the discovery server is further configured to communicate with the database.

8. The communication system according claim 1, wherein the processor of the discovery server is further configured to compare the received subscriber identity identifier to the plurality of subscriber identity identifiers, and wherein the communication interface of the discovery server is configured to retrieve a profile server identifier associated with the received subscriber identity identifier from the database.

9. A method for authenticating a communication device to a communication network using a subscriber identity element and a discovery server, wherein the subscriber identity element has a memory and a communication interface, wherein the subscriber identity element is assigned a subscriber identity identifier, wherein the communication network comprises a subnetwork with the discovery server, the subnetwork being operated by a mobile network operator (MNO) and corresponding to a discovery slice, wherein a bootstrap profile of the subscriber identity element is stored in the memory, wherein the bootstrap profile indicates a subnetwork identifier of the subnetwork and a discovery server identifier, wherein the discovery server comprises a communication interface and a processor, wherein the discovery server is assigned to the subnetwork of the communication network and is located in and addressable via the discovery slice, wherein the method comprises:
   establishing, by the subscriber identity element, a communication link to the discovery server using the subnetwork identifier by utilizing the communication interface of the subscriber identity element;
   transmitting, by the subscriber identity element, the subscriber identity identifier to the discovery server via the communication link by utilizing the communication interface of the subscriber identity element;
   receiving, by the discovery server, the subscriber identity identifier from the subscriber identity element via the communication link by utilizing the communication interface of the discovery server;
   determining, by the discovery server, a profile server identifier of a profile server on the basis of the subscriber identity identifier by utilizing the processor, wherein the profile server is associated with the subscriber identity element; and
   transmitting, by the discovery server, the profile server identifier to the subscriber identity element via the communication link by utilizing the communication interface of the discovery server.

* * * * *